METHOD FOR MAKING U-V RESPONSIVE PHOTOEMISSIVE TUBES

Original Filed Feb. 26, 1962 2 Sheets-Sheet 1

INVENTOR.
ALFRED H. SOMMER
BY Philip Schneider
Louis B. Applebaum
ATTORNEYS

July 26, 1966 A. H. SOMMER 3,262,748

METHOD FOR MAKING U-V RESPONSIVE PHOTOEMISSIVE TUBES

Original Filed Feb. 26, 1962 2 Sheets-Sheet 2

INVENTOR.
ALFRED H. SOMMER
BY Philip Schneider
Louis B. Applebaum
ATTORNEYS

United States Patent Office 3,262,748
Patented July 26, 1966

3,262,748
METHOD FOR MAKING U-V RESPONSIVE PHOTOEMISSIVE TUBES

Alfred H. Sommer, Princeton, N.J., assignor, by mesne assignments, to the United States of America as represented by the Secretary of the Navy

Original application Feb. 26, 1962, Ser. No. 175,854. Divided and this application Feb. 25, 1964, Ser. No. 347,319
4 Claims. (Cl. 316—10)

This application is a division of my original copending application Serial Number 175,854, filed February 26, 1962, which is assigned to the same assignee as the instant application.

This invention relates to photoesmissive tubes and especially to semitransparent cathodes for photoemissive tubes which are responsive to radiation in the ultraviolet region of the electromagnetic spectrum.

It has been found that outer space abounds with radiation whose wavelengths lie in the ultraviolet band of the spectrum. Thus, investigation of the universe becomes possible with equipment which is responsive to (or can "see") ultraviolet radiation just as it is possible with visible light and with radio waves.

Among the photoemissive materials which are most efficient in the ultraviolet (henceforth designated by "U-V") band are the alkali tellurides, such as cesium telluride, potassium telluride, or rubidium telluride. Up to now, however, it was not possible to construct U-V photoemissive tubes with semitransparent alkali telluride cathodes because:

(1) The conductivity of alkali telluride layers is so low that even the very small photoemission current required from the cathode of a photomultiplier tube builds up a charge on the layer which is difficult to neutralize; and (2) The vapor pressure of tellurium which is evaporated during the activation process is so high that the temperature of the tube must be kept below 200° C. during the degassing process whereas efficient degassing of the tube calls for higher degassing temperatures.

The present invention overcomes these difficulties by providing a conductive transparent substrate for the alkali telluride photoemissive layer and by utilizing a compound of tellurium and an element of low vapor pressure, such as indium, as the evaporation compound from which tellurium is deposited on the substrate.

(It should be noted that the term "transparent" as employed herein may include U-V transmissivities of the order of 100%, or may refer to lesser transmissivities. So long as some U-V radiation is being transmitted through a material, the material is termed "transparent.")

An object of the invention is to provide a method of fabricating a U-V responsive, alkali telluride-coated cathode for a photoemissive tube.

Other objects and many of the attendant advantages of this invention will be readily appreciated as the same becomes better understood by reference to the following detailed description when considered in connection with the accompanying drawings wherein.

Figure 1:
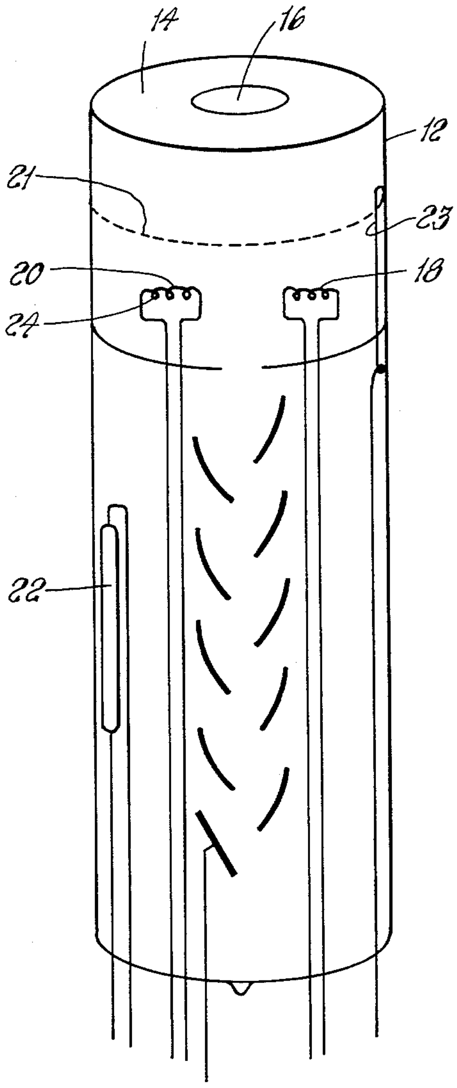
FIG. 1 is a schematic diagram showing elements necessary for construction of an alkali telluride transparent cathode in a multiplier phototube.
Figure 2:
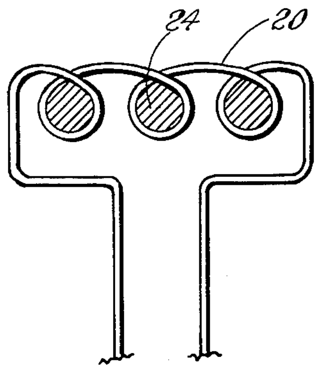
FIG. 2 is a schematic view of the coil used for depositing the tellurium layer on the window.

FIG. 1 indicates in a schematic fashion pertinent elements of a multiplier phototube constructed in accordance with this invention.

The envelope 12 of the tube is of glass and substantially cylindrical, although other shapes may be employed. One end 14 is flat and has a window 16 inserted in its center. The window 16 is formed from a plate 30 of material, such as lithium fluoride, which is highly transparent to U-V radiation.

A helix 18 of tungsten, a second helix 20 of conductive material such as tungsten or other metal which melts above the melting point of indium telluride, and a metallic tube 22 containing cesium chromate and aluminum are mounted within the tube. Independent sets of wire leads are connected to these components from outside the tube. The spaces 24 between the turns of the second helix 20 are filled with indium telluride compound.

After the tube has been evacuated, it is subjected to a degassing bake at about 350–400° C. Then a current is passed through the tungsten helix 18 and tungsten is evaporated to form a conductive layer 32 on the inside of the lithium fluoride window 16. The layer extends over the inside of the flat top and down along the side walls of the tube, the approximate extent being indicated by the dotted line 21. A piece of thin conductive metal 23 lies against the tube wall and forms a contact with the tungsten substrate. A wire lead is brought from the piece of conductive metal 23 to the outside of the tube. Although other conductive metals could be used, it has been found that tungsten is the best material for the substrate since, for a given conductivity, tungsten requires the thinnest layer and therefore provides the highest U-V transmissivity.

A thin layer 34 of photoemissive alkali telluride must now be deposited on the tungsten substrate. To do this, a layer of tellurium alone is first deposited; then the alkali is laid down on the tellurium and reacts with it to form a compound. If the evaporator material in the spaces of the second helix 20 had been tellurium alone (evaporation temperature of about 100° C.), it would have evaporated during the previously mentioned degassing bake in which temperatures of 350–400° C. are used. This is an undesirable situation. A compound of tellurium and an element having a low vapor pressure (indium telluride) is therefore employed as the evaporator material. After sufficient tungsten has been deposited, a current is passed through the second helix 20, the indium telluride is decomposed at a temperature of about 500° C. and a layer of tellurium is deposited upon the tungsten substrate on the inside of the window 20.

Figure 4:
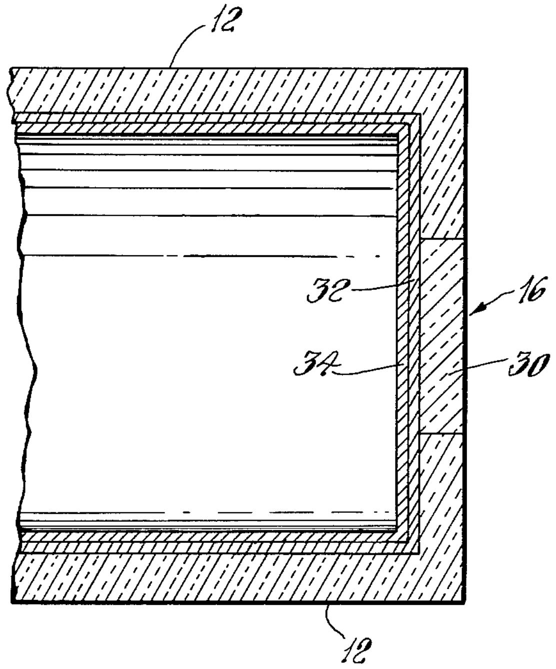
FIG. 4 is a broken-away cross-sectional view of the layered structure of the U-V window of the multiplier phototube.

A current is now passed through the cylinder 22 which contains a mixture of cesium chromate and aluminum. The heat decomposes the cesium chromate and aluminum replaces some of the cesium which is evaporated. The evaporated cesium combines with the layer of tellurium on the inside of the window to form a U-V responsive, photoemissive layer 34 of cesium telluride on the substrate layer of tungsten. FIGURE 4 shows the layered structure of the U-V window 16.

Figure 3:
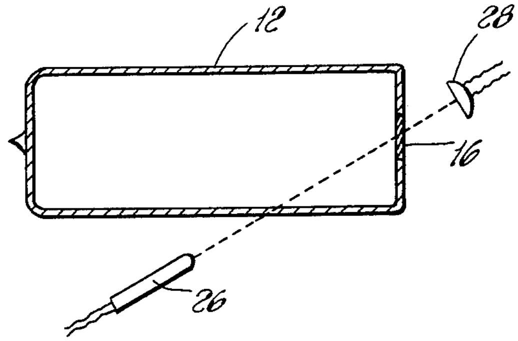
FIG. 3 is a diagram illustrating the method of checking the transmissivity of the tungsten and tellurium layers.

A method which can be used to check the effective thickness of the deposited layers employs a visible light source 26 and a photoelectric tube 28. The light is beamed into the photomultiplier tube from the outside and through the window 16 onto the photoelectric tube 28 as shown in FIG. 3. The current from the photoelectric tube is measured when nothing has yet been deposited on the window. The current is checked at various times as the tungsten is being deposited and the evaporation of tungsten is discontinued when transmissivity through the window is reduced to 85–90% of its original value. Evaporation of tellurium is discontinued when the transmissivity has been reduced somewhat lower than (approximately 3%) the value obtained with the tungsten layer alone.

When the cesium is evaporated, a different method is employed. The photoelectric cell is no longer employed but U-V light is projected directly into the photomultiplier tube through the window 16 and the photoemissive coating. The actual tube photo current is now measured and a layer thickness which provides near-maximum output current can be attained by halting evaporation of cesium when a decrease of tube current begins. (The tube current increases from zero to a maximum and then decreases in the process of depositing the cesium.)

The substrate and the photoemissive layer are extremely thin, probably of the order of 10 to 100 Angstrom units thick. Transparency depends upon the thinness of these layers.

Multiplier phototubes have been used herein as an example of a tube which may employ semitransparent photoemissive cathode coatings; however, such cathodes may be employed elsewhere as in image tubes and camera tubes, for example.

Obviously many modifications and variations of the present invention are possible in the light of the above teachings. It is therefore to be understood that within the scope of the appended claims the invention may be practiced otherwise than as specifically described.

I claim:

1. A method for making a U-V responsive, semi-transparent cathode in a photoemissive tube having a U-V transmitting section of material, at least one side of said section being internal to said tube, comprising the steps of:

evacuating said tube;

subjecting said tube to a degassing bake of approximately 350–400 degrees centigrade;

depositing a layer of conductive material on the internal side of said U-V transmitting section;

halting said deposition when the visible light transmitted through said layer of conductive material and said U-V transmitting section is approximately 85–90% of the visible light transmitted through said U-V transmitting section alone;

depositing a layer of tellurium upon said layer of conductive material by heating a compound consisting of tellurium and an element, such as indium, having a lower vapor pressure, the decomposition temperature of said compound being higher than that of said degassing bake;

halting deposition of said layer of tellurium when the visible light transmitted by said U-V transmitting section and said layers of conductive material and tellurium is approximately 3% lower than that of only said U-V transmitting section and said layer of conductive material;

evaporating an alkali metal so that its vapor combines with said tellurium layer to form an alkali telluride compound; and halting said evaporation of said alkali metal when the emission current of said photoemissive tube, as generated by U-V light passed through said transmitting section and incident upon said alkali telluride layer, is approximately at its maximum value.

2. A method of making a U-V responsive, semi-transparent cathode in a photoemissive tube having a U-V transmitting section of material, at least one side of said section being internal to said tube, comprising the steps of:

evacuating said tube;

subjecting said tube to a degassing bake of approximately 350–400 degrees centigrade;

depositing a layer of tungsten on the internal side of said U-V transmitting section;

halting said deposition when the visible light transmitted through said layer of conductive material and said U-V transmitting section is approximately 85 to 90% of the visible light transmitted through said U-V transmitting section alone;

depositing a layer of tellurium upon said layer of conductive material by heating a compound consisting of tellurium and an element, such as indium, having a low vapor pressure, the decomposition temperature of said compound being higher than that of said degassing bake;

halting deposition of said layer of tellurium when the visible light transmitted by said U-V transmitting section and said layers of conductive material and tellurium is approximately 3% lower than that of only said U-V transmitting section and said layer of conductive material;

evaporating cesium from a cesium compound so that cesium vapor combines with said tellurium layer to form a cesium telluride compound; and halting said evaporation of cesium when the emission current of said photoemissive tube, as generated by U-V light passed through said transmitting section and incident upon said alkali telluride layer, is approximately at its maximum value.

3. A method for making a U-V responsive, semi-transparent cathode in a photoemissive tube having a U-V transmitting section of material, at least one side of which is internal to said tube, comprising the steps of:

evacuating said tube;

subjecting said tube to a degassing bake of approximately 350–400 degrees centigrade;

depositing by evaporation a layer of conductive material on the internal side of said U-V transmitting section;

halting said deposition when the visible light transmitted through said layer of conductive material and said U-V transmitting section is approximately 85–90% of the transmissivity through said U-V transmitting section alone;

depositing by evaporation a layer of tellurium upon said layer of conductive material by heating a compound consisting of tellurium and an element, such as indium, having a low vapor pressure, the decomposition temperature of said compound being higher than that of said degassing bake;

halting deposition of said layer of tellurium when the visible light transmitted by said U-V transmitting section and said layers of conductive material and tellurium is approximately 3% lower than that of only said U-V transmitting section and said layer of conductive material;

evaporating an alkali metal so that its vapor combines with said tellurium layer to form an alkali telluride compound; and halting said evaporation of said alkali metal when the emission current of said photoemissive tube, as generated by U-V light passed through said transmitting section and incident upon said alkali telluride layer, is approximately at its maximum value.

4. A method for making a U-V responsive, semi-transparent cathode in a photoemissive tube having a U-V transmitting section of material, at least one side of which is internal to said tube, comprising the steps of:

evacuating said tube;

subjecting said tube to a degassing bake of approximately 350–400 degrees centigrade;

depositing by evaporation a layer of tungsten on the internal side of said U-V transmitting section;

halting said deposition when the visible light transmitted through said layer of conductive material and said U-V transmitting section is approximately 85–90% of the transmissivity through said U-V transmitting section alone;

depositing by evaporation a layer of tellurium upon said layer of conductive material by heating a compound consisting of tellurium and an element, such as indium, having a low vapor pressure, the decomposition temperature of said compound being higher than that of said degassing bake;

halting deposition of said layer of tellurium when the visible light transmitted by said U-V transmitting section and said layers of conductive material and tellurium is approximately 3% lower than that of only said U-V transmitting section and said layer of conductive material;

evaporating cesium from a cesium compound so that cesium vapor combines with said tellurium layer to form a cesium telluride compound; and halting said evaporation of cesium when the emission current of said photoemissive tube, as generated by U-V light passed through said transmitting section and incident upon said alkali telluride layer, is approximately at its maximum value.

References Cited by the Examiner

UNITED STATES PATENTS

| | | | |
|---|---|---|---|
| 1,904,985 | 4/1933 | Campbell | 316—5 |
| 2,431,401 | 11/1947 | Janes | 313—94 X |
| 2,574,356 | 11/1951 | Sommer | 316—20 |
| 2,668,778 | 2/1954 | Taft | 117—223 |
| 2,941,100 | 6/1960 | Fransworth | 313—65 |

JOHN F. CAMPBELL, *Primary Examiner.*

WHITMORE A. WILTZ, *Examiner.*

W. I. BROOKS, *Assistant Examiner.*